United States Patent
Sweet et al.

(10) Patent No.: US 11,316,458 B2
(45) Date of Patent: Apr. 26, 2022

(54) TURBOELECTRIC GENERATOR SYSTEM

(71) Applicant: ROLLS-ROYCE plc, London (GB)

(72) Inventors: Mark Sweet, Chesterfield (GB); David F Brookes, Birmingham (GB)

(73) Assignee: ROLLS-ROYCE plc, London (GB)

( * ) Notice: Subject to any disclaimer, the term of this patent is extended or adjusted under 35 U.S.C. 154(b) by 50 days.

(21) Appl. No.: 17/061,140

(22) Filed: Oct. 1, 2020

(65) Prior Publication Data

US 2021/0126567 A1 Apr. 29, 2021

(30) Foreign Application Priority Data

Oct. 23, 2019 (GB) .................................... 1915310

(51) Int. Cl.
| | |
|---|---|
| *H02P 9/42* | (2006.01) |
| *F02C 6/00* | (2006.01) |
| *F02C 7/06* | (2006.01) |
| *F02C 3/10* | (2006.01) |
| *H02P 101/25* | (2016.01) |
| *H02P 103/20* | (2016.01) |

(52) U.S. Cl.
CPC .................. *H02P 9/42* (2013.01); *F02C 3/10* (2013.01); *F02C 6/00* (2013.01); *F02C 7/06* (2013.01); *F05D 2220/32* (2013.01); *F05D 2220/76* (2013.01); *F05D 2220/768* (2013.01); *F05D 2220/7642* (2013.01); *F05D 2240/50* (2013.01); *H02P 2101/25* (2015.01); *H02P 2103/20* (2015.01)

(58) Field of Classification Search
CPC .... H02P 9/42; H02P 2101/25; H02P 2103/20; F02C 3/10; F02C 6/00; F02C 7/06; F05D 2220/32; F05D 2220/76; F05D 2220/7642; F05D 2220/768; F05D 2240/50
See application file for complete search history.

(56) References Cited

U.S. PATENT DOCUMENTS

| | | | |
|---|---|---|---|
| 4,862,341 A | 8/1989 | Cook | |
| 6,778,414 B2 * | 8/2004 | Chang | H02M 5/272 363/67 |

(Continued)

FOREIGN PATENT DOCUMENTS

| | | |
|---|---|---|
| EP | 2 007 003 A2 | 12/2008 |
| EP | 2 980 977 A1 | 2/2016 |

(Continued)

OTHER PUBLICATIONS

Apr. 8, 2020 Search Report issued in British Patent Application No. 1915310.5.

(Continued)

*Primary Examiner* — Pedro J Cuevas
(74) *Attorney, Agent, or Firm* — Oliff PLC

(57) ABSTRACT

A turboelectric generator system includes a gas turbine engine which includes, in fluid flow series, a gas-generator compressor, a combustor, a gas-generator turbine, and a variable-speed free power turbine. The system further comprises a variable-frequency electric machine rotatably connected with the free power turbine and a power converter configured to convert a variable frequency electrical output from the electric machine to a fixed frequency output.

14 Claims, 4 Drawing Sheets

(56) References Cited

U.S. PATENT DOCUMENTS

| | | | |
|---|---|---|---|
| 7,325,401 B1* | 2/2008 | Kesseli | F02C 1/05 60/677 |
| 7,944,094 B2* | 5/2011 | Hoffmann | F02C 9/28 307/151 |
| 8,015,812 B1* | 9/2011 | Kesseli | F02C 6/16 60/677 |
| 9,488,102 B2* | 11/2016 | Santini | F02C 3/10 |
| 9,531,190 B2* | 12/2016 | Martinelli | H02M 1/15 |
| 9,938,853 B2* | 4/2018 | Gemin | F01D 25/04 |
| 10,358,984 B2* | 7/2019 | Hino | H02J 15/006 |
| 10,443,511 B2* | 10/2019 | Ethier | F02C 9/42 |
| 10,612,463 B2* | 4/2020 | Kobayashi | F02C 3/10 |
| 10,815,882 B2* | 10/2020 | Marcucci | F25J 1/0022 |
| 11,008,950 B2* | 5/2021 | Ethier | F02B 37/004 |
| 2004/0119454 A1* | 6/2004 | Chang | H02J 4/00 323/284 |
| 2010/0013326 A1* | 1/2010 | Hoffmann | H02P 9/00 307/151 |
| 2010/0058731 A1 | 3/2010 | Haehner et al. | |
| 2011/0089691 A1 | 4/2011 | Jones et al. | |
| 2012/0262133 A1* | 10/2012 | Martinelli | H02M 1/15 323/234 |
| 2013/0269348 A1* | 10/2013 | Ethier | F02C 3/00 60/722 |
| 2014/0130500 A9* | 5/2014 | Ethier | F02C 7/32 60/722 |
| 2015/0345385 A1* | 12/2015 | Santini | F02C 3/05 290/52 |
| 2016/0105078 A1* | 4/2016 | Santini | F02C 7/36 290/52 |
| 2017/0114664 A1* | 4/2017 | Gemin | F01D 15/10 |
| 2017/0114665 A1* | 4/2017 | Gemin | F16F 15/00 |
| 2017/0222518 A1* | 8/2017 | Gemin | H02K 7/003 |
| 2017/0226933 A1* | 8/2017 | Klonowski | F02K 9/38 |
| 2017/0335773 A1* | 11/2017 | Shiraishi | F02C 7/32 |
| 2017/0363013 A1* | 12/2017 | Hino | F02C 3/10 |
| 2018/0016976 A1* | 1/2018 | Kobayashi | H02K 7/1823 |
| 2018/0187604 A1* | 7/2018 | Poumarede | B64D 35/08 |
| 2019/0055890 A1* | 2/2019 | Ethier | F02B 37/004 |
| 2019/0277197 A1 | 9/2019 | Kesseli et al. | |
| 2020/0088111 A1* | 3/2020 | Ethier | H02J 3/32 |
| 2021/0119512 A1* | 4/2021 | Veilleux, Jr. | F01D 15/10 |
| 2021/0246837 A1* | 8/2021 | Romero | F04D 25/04 |

FOREIGN PATENT DOCUMENTS

| | | |
|---|---|---|
| EP | 3 247 017 A1 | 11/2017 |
| FR | 2 975 547 A1 | 11/2012 |
| WO | 2018/112161 A2 | 6/2018 |

OTHER PUBLICATIONS

Mar. 16, 2021 Extended Search Report issued in European Patent Application No. 20201455.1.

* cited by examiner

TURBOELECTRIC GENERATOR SYSTEM

TECHNICAL FIELD

This disclosure relates to a turboelectric generator system, for example for use as an auxiliary power unit for an airliner.

BACKGROUND

Turboshaft-configuration gas turbines are known, and find particular application as auxiliary power units (APUs) in airliners. Most engines in such an application are single-spool turboshaft engines, which comprise a turbine which drives a compressor and the load. Some now out-of-service APUs utilised a single-spool, free power turbine configuration in which one turbine drives the compressor (forming a gas-generator spool) and another drives the load. Irrespective of configuration, most turboshaft engines are designed to drive loads which require a fixed synchronous speed (such as in electrical power generation) or operate according to a cube-law (such as ship propellers).

Such operational constraints on the engine often result in sub-optimal designs, as part load compressor surge margin is eroded due to the fixed output speed. This is because as the compressor is forced to operate at a constant non-dimensional speed ($N/\sqrt{T}$) despite a reduction in corrected flow ($W\sqrt{T}/P$). This leads to compromises in the aerodynamic design of the compressor, and consequently increases fuel consumption and emissions.

Whilst in the single-spool, free power turbine configuration there is no mechanical coupling between the load and the gas-generator, there is still an aerodynamic coupling between the turbines and thus compressor operability at part load is still affected to a degree.

SUMMARY

It is therefore desirable to permit the free power turbine to vary in rotational speed. Accordingly, the invention provides a turboelectric generator system, comprising:

a gas turbine engine including, in fluid flow series, a gas-generator compressor, a combustor, a gas-generator turbine, and a variable-speed free power turbine;

a variable-frequency electric machine rotatably connected with the free power turbine;

a power converter configured to convert a variable frequency electrical output from the electric machine to a fixed frequency output.

In an embodiment, the variable frequency electric machine is a permanent-magnet synchronous electric machine.

In an embodiment, the power converter is configured to output a fixed frequency of from 360 to 440 hertz.

In an embodiment, the power converter is configured to output a fixed frequency of from 390 to 410 hertz.

In an embodiment, the power converter comprises a rectifier stage and an inverter stage In an embodiment, the power converter is a fully-rated converter In an embodiment, the power converter is a partially-rated converter In an embodiment, the power converter is a bidirectional power converter.

In an embodiment, the system further comprises a load compressor for supply of compressed air.

In an embodiment, the system further comprises a second electric machine configured to drive the load compressor.

In an embodiment, the load compressor is rotatably connected with the free power turbine.

In an embodiment, the load compressor is mounted on an oil-free bearing

In an embodiment, the oil-free bearing is one of:
a ceramic bearing;
an air bearing.

In an embodiment, the load compressor includes a filtration system on its output.

In an embodiment, the turboelectric generator system is an auxiliary power unit for an airliner.

BRIEF DESCRIPTION OF THE DRAWINGS

Embodiments will now be described by way of example only with reference to the accompanying drawings, which are purely schematic and not to scale, and in which.

DETAILED DESCRIPTION

Figure 1:
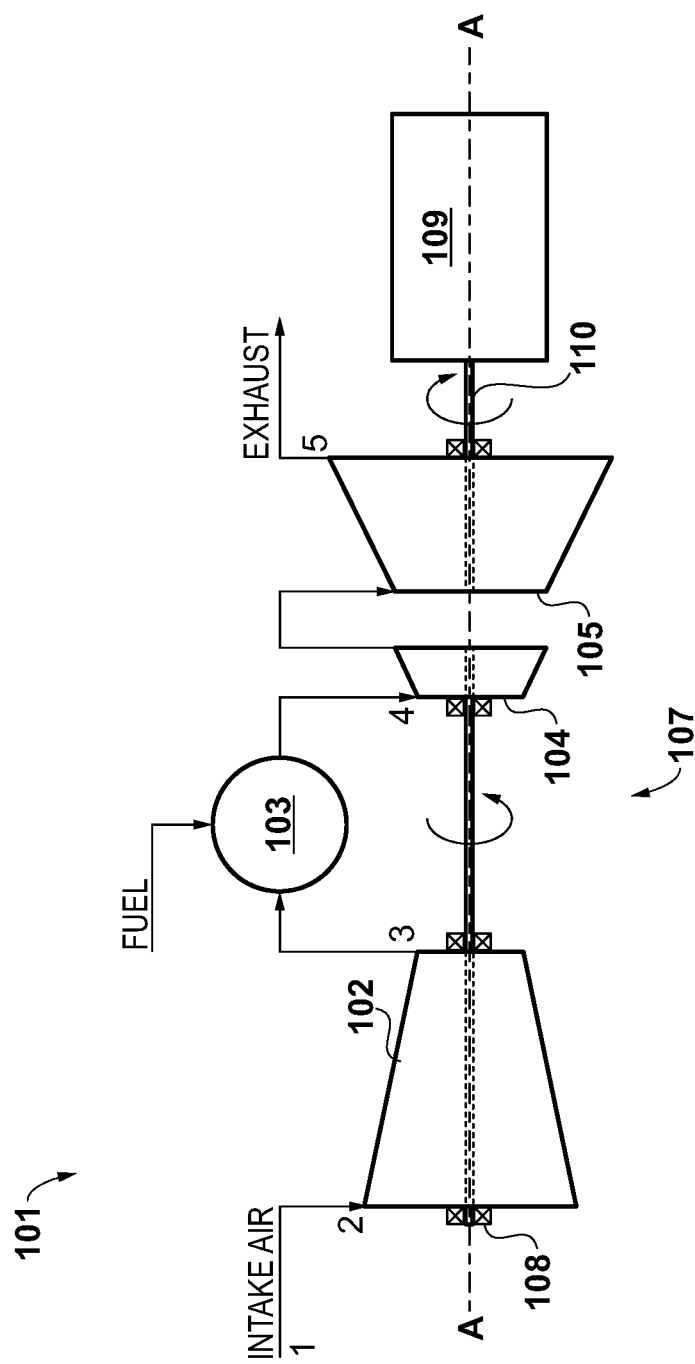
FIG. 1 is a block diagram illustrating an embodiment of a turboshaft gas turbine engine which drives a load.

A block diagram illustrating an embodiment of a turboelectric generator system is shown in FIG. 1. The system generally comprises a gas turbine engine configured to drive a load.

In FIG. 1, station numbering according to ARP 755A are provided. The gas turbine engine, identified generally by numeral 101, comprises in fluid flow series a gas-generator compressor 102, a combustor 103, a gas-generator turbine 104, and a free power turbine 105. The gas-generator compressor 102 and the gas-generator turbine 104 are mechanically linked so as to rotate in unison around an engine centreline A-A by an interconnecting shaft 106, and together form a gas-generator spool 107. Bearings 108 support the gas-generator spool 107 relative to static structures of the engine 101. The free power turbine 105 is mechanically linked with a load 109 via an output shaft 110, and is configured as a variable speed power turbine. In this way, a much more efficient free power turbine is provided.

In operation, intake air is received at station 1 and enters the gas-generator compressor 102 at station 2. The air is compressed by the gas-generator compressor 102, and exits therefrom at station 3 where it is supplied to the combustor 103, mixed with fuel and ignited. The hot combustion products leave the combustor 103 at station 4 and are expanded through the gas-generator turbine 104, causing it to rotate and drive the compressor 102. At this point the flow exiting the gas-generator turbine 104 still comprises a significant amount of enthalpy, which develops work in the free power turbine 105, thereby driving the load 109.

In the present embodiment, the free power turbine 105 is configured to rotate around the engine centreline A-A. It will be appreciated that in alternative embodiments the free power turbine 105 may be located on an axis different from the engine centreline A-A.

In the present embodiment, the free power turbine 105 is configured to rotate in the opposite direction to the gas-generator turbine 104, i.e. they are arranged to contra-rotate. As will be described further with reference to FIG. 2 onward, this may reduce the amount of flow turning required between the turbine stages. However, in alternative embodiments the free power turbine 105 may instead be configured to co-rotate with the gas-generator turbine 104.

In the present embodiment, the load 109 is a variable-speed load. A first embodiment of the load 109 will be described with reference to FIG. 3, and a second embodiment will be described with reference to FIG. 4.

In the configuration shown in FIG. 1, the gas-generator spool 107 and the combination of the free power turbine 105 and the load 109 are both able to vary in speed. In this way, fuel consumption and emissions may be reduced.

Figure 2:
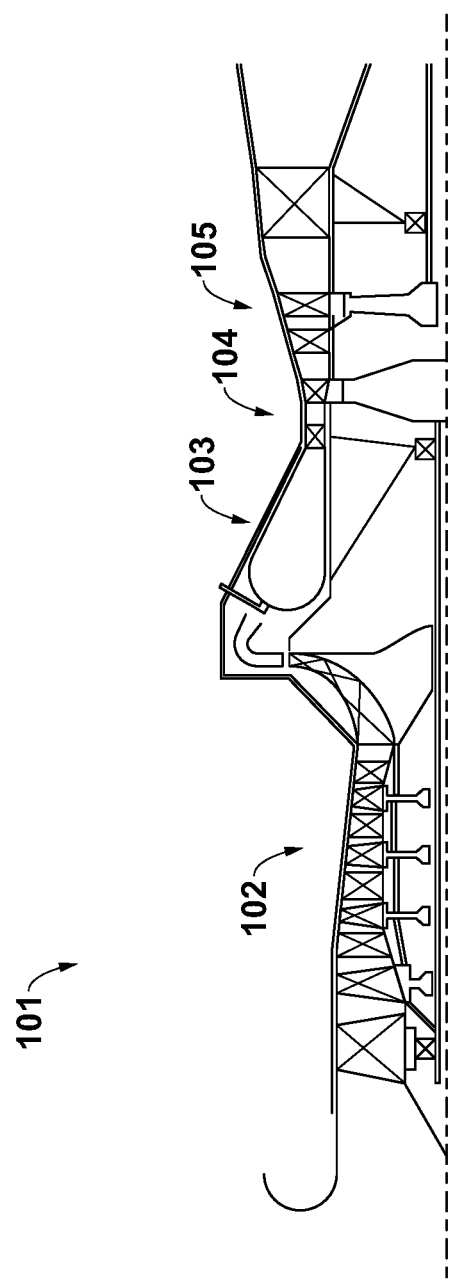
FIG. 2 is a general arrangement of the engine of FIG. 1.

A general arrangement of a first embodiment of the engine 101 is shown in FIG. 2. For clarity, only the half of the engine above the centreline A-A is shown.

In the embodiment of FIG. 2 the compressor 102 is an axial-centrifugal compressor, and thus comprises a number of axial compression stages upstream of a final centrifugal stage. In this way, high pressure ratios may be achieved on the single gas-generator spool 107 without the attendant complexity and losses associated with ducting between two centrifugal stages. In the present embodiment, the design point pressure ratio of the compressor 102 is from 12 to 16. As used herein, the term "design point" for the engine 101 is the maximum rated power operating condition at International Standard Atmosphere sea level static conditions.

In the present embodiment, the gas-generator turbine 104 is a single stage turbine. In a specific embodiment, the gas-generator turbine 104 is a high-work single stage turbine with a design point expansion ratio of from 4.5 to 5.5.

In the present embodiment, the free power turbine 105 is also single stage turbine. This reduces weight, thereby improving power-to-weight ratio. However, it is contemplated that in other embodiments, the free power turbine 105 may be a two-stage turbine. Whilst the single-stage turbine is lighter, the two-stage free power turbine does permit a lower loading and thus higher efficiency and potentially a higher maximum power output.

In the present embodiment, the free power turbine 105 has a design point expansion ratio of from 1.5 to 2.5.

Figure 3:
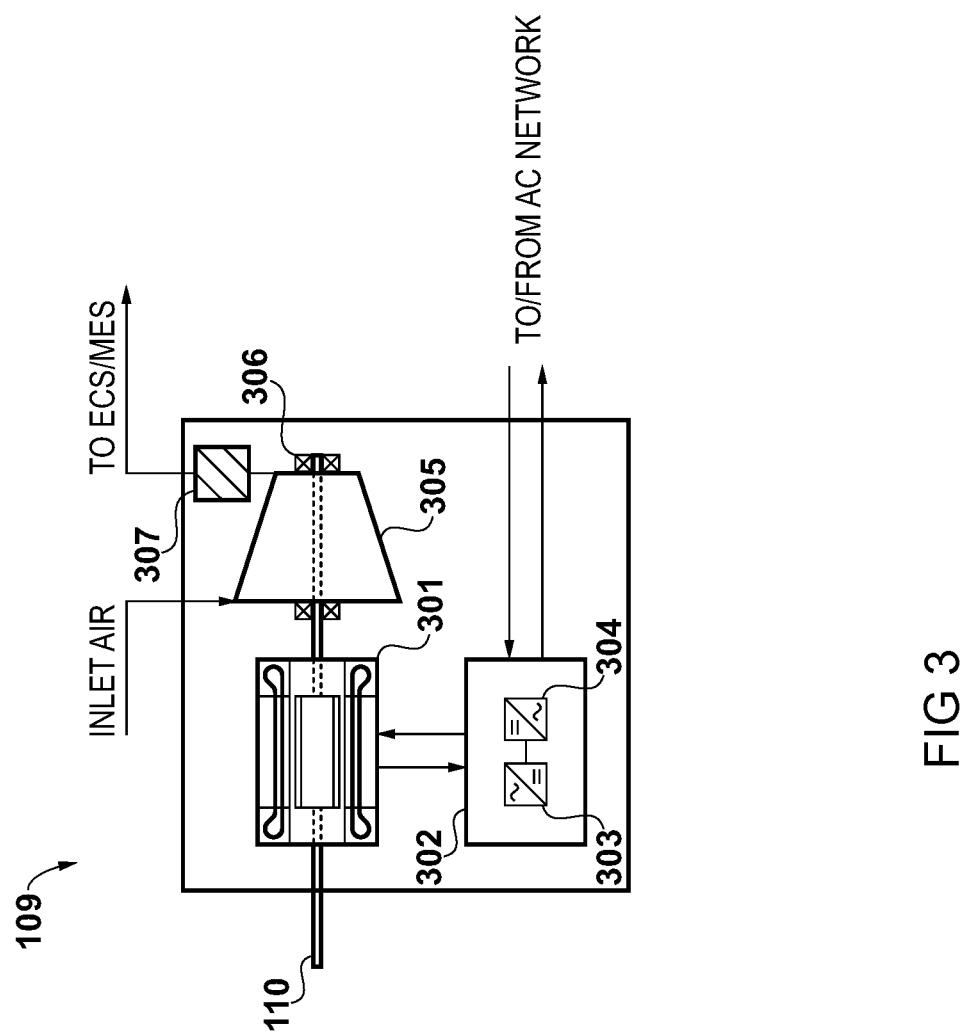
FIG. 3 shows a first embodiment of the load shown in FIG. 1.

A first embodiment of the load 109 is shown in FIG. 3. The load 109 comprises a variable-frequency electric machine 301 which is rotatably connected with the variable speed free power turbine 105 via, in this embodiment, the output shaft 110. Those skilled in the art will understand the term variable-frequency electric machine refers to a class of electric machine types whose output or input may vary in electric frequency. Thus, for example, the electric machine may be an induction machine, a wound-field synchronous machine, etc. In the present embodiment, the variable-frequency electric machine 301 is a permanent magnet synchronous machine (PMSM). This provides a high power density and high efficiency. It also means that in the present embodiment the electric machine 301 may be used as both a generator and a motor.

As will be appreciated by those skilled in the art, many electrical networks require a fixed frequency alternating current (ac) output. Thus, as set out in the introduction, many prior art turboelectric generation systems utilise a fixed frequency electric machine directly coupled to an ac network. This imposes a requirement for a fixed rpm on either a single spool engine or on its free power turbine, which as described previously still has an impact on the gas-generator spool due to the aerodynamic coupling therebetween.

Thus the load 109 further comprises a power converter 302 configured to convert the variable frequency electrical output from the variable-frequency electric machine 301 into a fixed frequency output for the ac network.

In the present embodiment, the power converter is configured to output a fixed frequency of from 360 to 440 hertz. In a specific embodiment, the power converter is configured to output a fixed frequency of from 390 to 410 hertz. In a nominal mode of operation, the power converter is configured to output a fixed frequency of 400 hertz. In this way it may be integrated with a standard ac network on an airliner.

In an embodiment, the power converter comprises a rectifier stage and an inverter stage. Thus, in operation, the variable frequency alternating current from the variable-frequency electric machine 301 is converted to a direct current (dc) intermediate by the rectifier. The inverter then proceeds to convert the dc intermediate to a fixed frequency alternating current for output to the ac network. In such a configuration, the power converters may be fully rated, i.e. they are adapted to convert the full output of the electric machine 301 allowing full variability in speed of the electric machine 301, and thus of the free power turbine 105. It is contemplated that partially-rated converters could be used, which may reduce weight, but may also impose a speed constraint, but still will allow a degree of variability in terms of the rpm of the electric machine 301.

The inventors have made the surprising determination that despite the presence of the power converter 302, in terms of both weigh and losses, such an arrangement is indeed more efficient as an overall system, than a fixed-speed gas turbine engine connected with a fixed-speed generator.

Indeed, in the embodiment of FIG. 3, the power converter 302 is in fact configured as a bidirectional converter and thus may drive the variable-frequency electric machine 301 as well as convert its output for the ac network.

Thus, in this example, the power converter 302 comprises a back-to-back arrangement of bidirectional ac-dc converters. A first bidirectional ac-dc converter 303 is connected on its ac side to the variable frequency output of the electric machine 301. Its dc side is connected with a dc side of a second bidirectional ac-dc converter 304, whose ac side is connected with the ac network.

In operation as a generator, the power converter 302 operates in the manner described above. However, as the conversion stages are bidirectional, it means that the variable-frequency electric machine 301 may be operated as a motor, by converting fixed frequency ac from the ac network to a dc intermediate with the second bidirectional ac-dc converter 304, and converting the dc intermediate to variable frequency ac with the first bidirectional ac-dc converter 303. In this way the output shaft 110 may be turned without requiring operation of the gas-generator spool.

This functionality is particularly advantageous in the present example, in which the turboelectric generator system is an auxiliary power unit for an airliner. This is because the load 109 also comprises a load compressor 305 rotatably connected with the free power turbine 105 via, in this embodiment, the output shaft 110. The load compressor 305 supplies air for engine start and for the cabin environmental control system. Thus, air may be supplied by the load compressor 305 without operation of the gas-generator spool.

In operation, the load compressor 305 receives fresh inlet air and compresses it for the environmental control system (ECS) or for main engine start (MES). The load compressor is mounted one or more bearings 306, in this example two to support the output shaft 110. In order to guarantee odour-free supply of air to the ECS, in the present embodiment the load compressor 305 comprises a filtration system, such as a filter 307, on its output. In this embodiment, the filter 307 is a fibre filter for removing oil vapour or droplets from the air supply. An activated carbon filter, or any other type of suitable filtration system may be provided.

Additionally or alternatively, the bearings 306 may be oil-free bearings, which prevents oil blow-by into the air supply to the ECS system. The oil-free bearings may be one or more of a ceramic bearing or an air bearing, or any other type of oil-free bearing.

Figure 4:
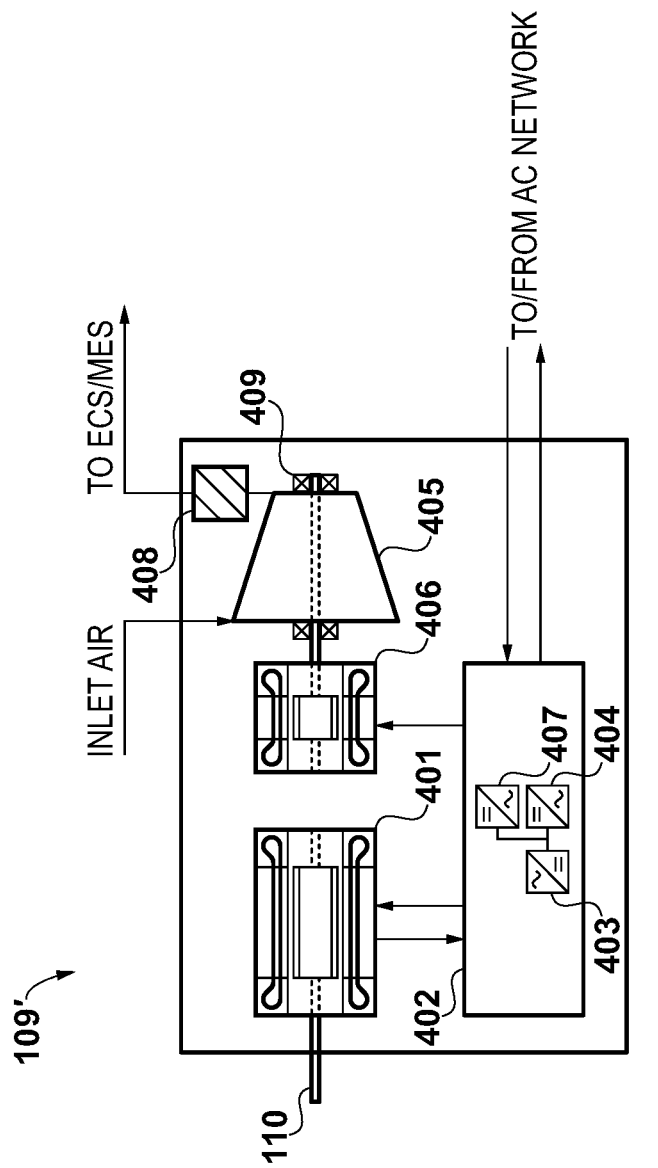
FIG. 4 shows a second embodiment of the load shown in FIG. 1.

FIG. 4 illustrates another embodiment of the load, which is identified as 109'.

In this example, the load 109' comprises a variable-frequency electric machine 401 connected via the output shaft 110 to the free power turbine 105. The load 109' further comprises a power converter 402, including a first ac-dc converter 403 and a second ac-dc converter 404. In this embodiment, a load compressor 405 is driven not via the output shaft 110 but electrically by a second variable-frequency electric machine 406, which receives power from a third ac-dc converter 407 in the power converter 402, which converts the dc intermediate produced by the first ac-dc converter 403 to ac for the second electric machine 406. Inlet air supplied to the load compressor 405 is, in operation, compressed and, in this embodiment supplied via a filtration system 408 to the ECS or for MES.

Whilst this does necessitate an increase in the power rating of the electric machine 401 and the power converter 402, due to the requirement to transmit power that in the embodiment of FIG. 3 is transmitted via the output shaft 110, it does enable the load compressor 405 to be driven at a different speed to the free power turbine 105 and the electric machine 401. This may enable a reduction in the size of the compressor 405 and thus a reduction in weight.

Further, it may enable the operation of the compressor 405 at the correct non-dimensional speed for the required flow rate, rather than being constrained to operate at the same speed as the free power turbine 105. This may enable a fixed geometry design for the compressor 405, i.e. due to the variable frequency operation of the electric machine 406, there is no requirement to provide variable inlet guide vanes to adjust the compressor geometry.

Finally, it also ensures that there is no possibility of oil or exhaust from the gas turbine section of the turboelectric generation system can enter the air supply from the load compressor 405, as its one or more bearings 409 are completely isolated from said engine. The one or more bearings 409, as with the embodiment described with reference to FIG. 3, may be oil-free bearings, for example ceramic or air bearings, or any other type of oil-free bearings.

Various examples have been described, each of which feature various combinations of features. It will be appreciated by those skilled in the art that, except where clearly mutually exclusive, any of the features may be employed separately or in combination with any other features and the invention extends to and includes all combinations and sub-combinations of one or more features described herein.

The invention claimed is:

1. A turboelectric generator system, comprising:
   a gas turbine engine including, in fluid flow series, a gas-generator compressor, a combustor, a gas-generator turbine, and a variable-speed free power turbine;
   a variable-frequency electric machine rotatably connected with the free power turbine;
   a power converter configured to convert a variable frequency electrical output from the electric machine to a fixed frequency output; and
   a load compressor for supply of compressed air, the load compressor being rotatably connected with the free power turbine.

2. The turboelectric generator system of claim 1, wherein the variable-frequency electric machine is a permanent-magnet synchronous electric machine.

3. The turboelectric generator system of claim 1, wherein the power converter is configured to output a fixed frequency of from 360 to 440 hertz.

4. The turboelectric generator system of claim 1, wherein the power converter is configured to output a fixed frequency of from 390 to 410 hertz.

5. The turboelectric generator system of claim 1, wherein the power converter comprises a rectifier stage and an inverter stage.

6. The turboelectric generator system of claim 1, wherein the power converter is a fully-rated converter.

7. The turboelectric generator system of claim 1, wherein the power converter is a bidirectional power converter.

8. The turboelectric generator system of claim 7, wherein the bidirectional power converter is configured to convert a variable frequency, alternating current to a direct current intermediate, and convert the direct current intermediate to a fixed frequency alternating current, and vice versa.

9. The turboelectric generator system of claim 1, further comprising a second electric machine configured to drive the load compressor.

10. The turboelectric generator system of claim 9, wherein the load compressor is mounted on one or more oil-free bearing.

11. The turboelectric generator system of claim 10, wherein the one or more oil-free bearing is one of:
    a ceramic bearing; and
    an air bearing.

12. The turboelectric generator system of claim 1, wherein the load compressor includes a filtration system on its output.

13. The turboelectric generator system of claim 1, wherein the turboelectric generator system is an auxiliary power unit for an airliner.

14. The turboelectric generator system of claim 1, wherein the load compressor is mounted on one or more oil-free bearing.

* * * * *